(12) United States Patent
Tytgat et al.

(10) Patent No.: US 12,014,092 B2
(45) Date of Patent: Jun. 18, 2024

(54) SYSTEM AND METHOD FOR OBJECT-ANNOTATED TRAPPING

(71) Applicant: ESKO Software BVBA, Ghent (BE)

(72) Inventors: John Tytgat, Ghent (BE); Kristiaan K. A. Van Bael, Sint-Laureins (BE); Manuel Mérida Angulo, Ghent (BE)

(73) Assignee: Esko Software BVBA, Ghent (BE)

( * ) Notice: Subject to any disclaimer, the term of this patent is extended or adjusted under 35 U.S.C. 154(b) by 0 days.

(21) Appl. No.: 17/054,238

(22) PCT Filed: Jun. 22, 2020

(86) PCT No.: PCT/EP2020/067368
§ 371 (c)(1),
(2) Date: Nov. 10, 2020

(87) PCT Pub. No.: WO2020/254692
PCT Pub. Date: Dec. 24, 2020

(65) Prior Publication Data
US 2022/0188047 A1    Jun. 16, 2022

Related U.S. Application Data

(60) Provisional application No. 62/864,702, filed on Jun. 21, 2019.

(51) Int. Cl.
*G06F 3/12* (2006.01)
*G06K 15/02* (2006.01)

(52) U.S. Cl.
CPC .......... *G06F 3/1208* (2013.01); *G06F 3/1204* (2013.01); *G06F 3/1243* (2013.01);
(Continued)

(58) Field of Classification Search
CPC .... G06F 3/1208; G06F 3/1204; G06F 3/1243; G06F 3/1256; G06F 3/1257;
(Continued)

(56) References Cited

U.S. PATENT DOCUMENTS 5,542,052 A    7/1996   Deutsch et al.
5,649,220 A    7/1997   Yosefi
(Continued)

FOREIGN PATENT DOCUMENTS

EP    0640941 A2   3/1995
EP    0674277 A2   9/1995
(Continued)

OTHER PUBLICATIONS

International Search Report and Written Opinion for International Application No. PCT/EP2020/067368, dated Sep. 30. 2020, 10 pages.
(Continued)

*Primary Examiner* — Helen Zong
(74) *Attorney, Agent, or Firm* — Buchanan Ingersoll & Rooney PC

(57) ABSTRACT

Computer-implemented methods, computer program products, and computer systems for preparing a digital artwork document for printing. An input digital artwork document is modified to enhance or avoid a physically printed result by generating an output digital artwork document containing digital objects that align to the one or more features of one or more portions of the artwork, such as for use in trapping, reverse trapping, or pullback of objects, providing rich black, white underprint, or spot varnish. The digital objects are generated in accordance with a combination of first and second sets of instructions, such as a first set generated by a computerized expert system, and the second set created as an exception to the first set. The output document is annotated by storing at least one association between each instruction in the second set and each corresponding selected portion of the document governed by the instruction.

19 Claims, 18 Drawing Sheets

(52) U.S. Cl.
CPC .......... *G06F 3/1256* (2013.01); *G06F 3/1257* (2013.01); *G06K 15/1826* (2013.01)

(58) Field of Classification Search
CPC .... G06F 3/1282; G06F 3/1205; G06F 3/1254; G06K 15/1826
See application file for complete search history.

(56) References Cited

U.S. PATENT DOCUMENTS

| | | |
|---|---|---|
| 5,666,543 A | 9/1997 | Gartland |
| 6,046,818 A | 4/2000 | Benson |
| 6,407,821 B1 | 6/2002 | Hohensee et al. |
| 6,507,848 B1 | 1/2003 | Crosby et al. |
| 6,671,064 B2 | 12/2003 | Rumph et al. |
| 6,697,078 B2 | 2/2004 | Becker et al. |
| 7,075,551 B2 | 7/2006 | Becker et al. |
| 7,139,098 B2 | 11/2006 | Klassen |
| 7,346,894 B1 | 3/2008 | Cook |
| 7,360,157 B1 | 4/2008 | Yalovsky |
| 7,375,848 B2 | 5/2008 | Nakami et al. |
| 7,379,585 B2 | 5/2008 | Mankl |
| 7,551,313 B2 | 6/2009 | Kuroki |
| 7,783,971 B2 * | 8/2010 | Villaron ................. G06Q 10/10 715/248 |
| 7,817,305 B2 | 10/2010 | Joergens et al. |
| 7,940,413 B2 | 5/2011 | Ozawa |
| 7,969,604 B2 | 6/2011 | Markovic |
| 8,271,871 B2 | 9/2012 | Marchesotti |
| 8,289,565 B2 | 10/2012 | Joergens et al. |
| 8,310,713 B2 | 11/2012 | Sugimoto et al. |
| 8,593,694 B2 | 11/2013 | Tamura |
| 8,599,409 B2 | 12/2013 | Chae et al. |
| 8,626,720 B2 | 1/2014 | Hurek et al. |
| 8,660,373 B2 | 2/2014 | Fan et al. |
| 8,705,136 B2 | 4/2014 | Jorgens et al. |
| 9,104,356 B2 | 8/2015 | Tan |
| 9,333,738 B2 | 5/2016 | Ferrari |
| 9,609,175 B2 | 3/2017 | Gnutzmann |
| 9,715,336 B2 | 7/2017 | Topakas et al. |
| 10,395,399 B2 | 8/2019 | Gnutzmann |
| 2004/0109183 A1 * | 6/2004 | Hawksworth ............ H04N 1/58 358/1.9 |
| 2004/0257622 A1 | 12/2004 | Shibaki et al. |
| 2006/0033959 A1 | 2/2006 | Allen |
| 2007/0124670 A1 | 5/2007 | Finck et al. |
| 2008/0198396 A1 | 8/2008 | Nakami et al. |
| 2013/0117644 A1 | 5/2013 | Dhawan et al. |
| 2018/0047190 A1 | 2/2018 | Gnutzmann |
| 2018/0253878 A1 | 9/2018 | Jain et al. |
| 2018/0285703 A1 | 10/2018 | Eden et al. |
| 2018/0336195 A1 | 11/2018 | Basu et al. |
| 2020/0195793 A1 * | 6/2020 | Tajima ............... H04N 1/00477 |

FOREIGN PATENT DOCUMENTS

| | | |
|---|---|---|
| EP | 0887746 A2 | 12/1998 |
| EP | 0986002 A2 | 3/2000 |
| EP | 1241870 A2 | 9/2002 |
| EP | 2092730 A1 | 8/2009 |
| EP | 2231414 A2 | 9/2010 |
| EP | 2246808 A2 | 11/2010 |
| EP | 3282354 A1 | 2/2018 |
| EP | 3382607 A1 | 10/2018 |
| WO | 0118690 A2 | 3/2001 |
| WO | 0184299 A2 | 11/2001 |
| WO | 2006020634 A2 | 2/2006 |
| WO | 2008062038 A1 | 5/2008 |
| WO | 2009083857 A2 | 7/2009 |
| WO | 2012022944 A1 | 2/2012 |

OTHER PUBLICATIONS

Kodak, "Prinergy Evo Workflow", Software Version 6.0, Client User Guide, English, dated Oct. 17, 2013, retrieved from the Internet: URL:ftp://ftp.amoscz.cz/produkty/prinergyEVO/Evo_6_Client_User_Guide_Oct17.pdf, retrieved Sep. 18, 2020, pp. 1-668.
Creo, "TrapWise Precision Trapping", 2004, 3 pages.
International Preliminary Report on Patentability and Written Opinion for International Application No. PCT/ EP2020/067368, dated Dec. 21, 2021, 8 pages.

* cited by examiner

| SUPPLEMENT FACTS / FAITS SUR LE SUPPLÉMENT / INFO SUPPLEMENTEN | | |
|---|---|---|
| 48 Servings | | Cherry Orange |
| Serving Size 1 Level Scoop (20 g) | | |
| Servings Per Container Approximately 48 | | |
| Amount Per Serving / Amount Per Serving / Amount Per Serving | Amt | %DV |
| Energy | 264 kJ | |
|  | 63 kcal | |
| Calories | | 5 |
| Total Carbohydrate | 1g | 1% |
| Vitamin D (as Cholecalciferol) | 500IU | 125% |
| Thiamin (as Thiamin HCl) | 2mg | 133% |
| Niacin (as Nicotinic Acid) | 20mg | 100% |
| Folic Acid | 200mcg | 50% |
| Vitamin B12 (as Cyanocobalamin) | 10mcg | 167% |
| Pantothenic Acid (as D-Calcium Pantothenate) | 10mg | 100% |
| GetSetMAX® Proprietary Blend | | |
|    Creatine Monohydrate | 1g | † |
|    [Membranaceus Extract (root) & Panax notoginseng Extract (root)] | 25mg | † |
|    L-Citrulline Malate | 0.7g | † |
|    Beta-Alanine | 1.5g | † |
| Energy And Focus Complex | | |
| N-Acetyl-L-Carnitine HCl | 375mg | † |
| N-Acetyl-Tyrosine | 250mg | † |
| Caffeine | 150mg | † |
| Citrus Bioflavanoids | 100mg | † |

% Daily Value is based on a 2,000 calorie diet. Your daily values may be higher or lower based on your calorie needs.
† Daily Value (DV) not established

FIG. 4
PRIOR ART

| SUPPLEMENT FACTS / FAITS SUR LE SUPPLÉMENT / INFO SUPPLEMENTEN | | |
|---|---|---|
| 48 Servings — Serving Size 1 Level Scoop (20 g) — Servings Per Container Approximately 48 — Cherry Orange | | |
| Amount Per Serving / Amount Per Serving / Amount Per Serving | Amt | %DV |
| Energy | 264 kJ | |
|  | 63 kcal | |
| Calories | | 5 |
| Total Carbohydrate | 1g | 1% |
| Vitamin D (as Cholecalciferol) | 500IU | 125% |
| Thiamin (as Thiamin HCl) | 2mg | 133% |
| Niacin (as Nicotinic Acid) | 20mg | 100% |
| Folic Acid | 200mcg | 50% |
| Vitamin B12 (as Cyanocobalamin) | 10mcg | 167% |
| Pantothenic Acid (as D-Calcium Pantothenate) | 10mg | 100% |
| GetSetMAX® Proprietary Blend | | |
| Creatine Monohydrate | 1g | † |
| [Membranaceus Extract (root) & Panax notoginseng Extract (root)] | 25mg | † |
| L-Citrulline Malate | 0.7g | † |
| Beta-Alanine | 1.5g | † |
| Energy And Focus Complex | | |
| N-Acetyl-L-Carnitine Hcl | 375mg | † |
| N-Acetyyl-Tyrosine | 250mg | † |
| Caffeine | 150mg | † |
| Citrus Bioflavanoids | 100mg | † |

\* % Daily Value is based on a 2,000 calorie diet. Your daily values may be higher or lower based on your calorie needs.
† Daily Value (DV) not established

FIG. 5
PRIOR ART

SYSTEM AND METHOD FOR OBJECT-ANNOTATED TRAPPING

CROSS-REFERENCE TO RELATED APPLICATIONS

This application is a National Phase of PCT Application Ser. No. PCT/EP2020/067368, filed Jun. 22, 2020, which claims priority to U.S. Provisional Application Ser. No. 62/864,702, titled SYSTEM AND METHOD FOR OBJECT-ANNOTATED TRAPPING, filed Jun. 21, 2019, incorporated herein by reference in its entirety.

BACKGROUND OF THE INVENTION

In graphic arts, trapping is the operation to optimize a graphic description for printability. For example, mis-registration between printing separations (e.g. C=cyan, M=magenta, Y=yellow, K=Black) is an issue frequently encountered when printing on a printing press. Mis-registration causes a deterioration in quality of the final print. Colors as discussed herein may be depicted in various shades of gray.

For example, consider the interface depicted in FIG. 1A, in which a yellow circle 10, formed in the Y separation, intersects cyan rectangle 12, formed in the C separation. If circle 10 is darkened by printing it on top of rectangle 12, as depicted in FIG. 1A, mis-registration will not play an important role. But, in a design in which rectangle 12 in the C separation is knocked out by the circle (i.e. the rectangle 12 does not print in the area of the C separation where circle 10 from the Y separation is expected to print), the difference between perfect registration, as depicted in FIG. 1B, and mis-registration, as depicted in FIG. 1C, is visible. As shown in FIG. 1C, a white gap 11 (or green edge) may appear along the visible edge between the circle 10 and the rectangle 12. It should be noted that the figures as referred to herein may be provided in grayscale, with different shades of gray representing different colors. Although referred to herein with respect to specific exemplary separations (Y and C), it should be understood that the concepts as discussed herein are applicable to interactions of adjacent edges of objects created by combination or juxtaposition of separations.

The perception and visibility of the deterioration in quality to the human eye depends on the distance of the registration error, but also on the actual subject matter printed.

It is well known that the visual result for a given geometric registration deviation can be vastly improved by changing the objects in such a way that the registration becomes less critical. This technique is called trapping and comprises creating extra prepress objects aligned to the original artwork in areas where mis-registration may cause undesired visual effects. The additional prepress objects are typically achieved by either spreading or choking one of the original objects to ensure that a possible gap is replaced by a very close color. FIG. 1D shows that creating an extra prepress object 15 in the Y separation in the intersection of the circle and the rectangle, removes the visible white gap, as compared to FIG. 1C, by creating a green shape where object 15 in the Y separation overlaps rectangle 12 in the C separation. The decision as to whether it would be better to have the green shape should overlap the rectangle 12 or the circle 10 (or not to trap and permit white gap 11, instead) in a misregistered print, in at least some more complex circumstances, may be a human decision based on experience and perception not readily translated to a machine, even a machine programmed with an expert system.

Notably, the examples illustrated herein may include features that are emphasized or magnified for illustration, and none of the examples as depicted herein are intended to reflect any particular scale. Thus, the relative size of trapping object 15 as compared to original artwork features 10 and 12 is not intended to be accurate or representative of the actual size of such an object in a typical trapping application for objects at the size presented in the figures.

When a color comprises more than one separation, such as the green rectangle (formed from the C and Y separations), as depicted in FIG. 2A in perfect registration, a visually unpleasant or distracting multi color band may occur due to misregistration, such as cyan band 22 and yellow band 24 depicted in FIG. 2B. One trapping counter measure is to reduce the size of the object in one or more of the separations that contribute to the final color. For example, as depicted in FIG. 2C, the rectangle is now formed from a relatively larger object 26 in the C separation than object 28 in the Y separation, ensuring that the border of the printed rectangle (even in perfect registration) has a consistent cyan color more closely matching the green body color of rectangle 20 and not a mixture of a yellow border and a cyan border. Such an operation is sometimes referred to as "pullback," because object 28 in the Y separation is pulled back from the edges of the original object 20, which remain the dimensions of object 26 in the C separation.

Modern trapping is executed in a software program. For a specific set of printing devices (high quality offset presses, digital presses with limited registration errors), the trapping technology has evolved to a fully automatic operation performed in a late stage before printing, typically in the raster image processor (RIP). For another set of printing devices, most typically flexo presses printing on difficult substrates (e.g. substrates that easily stretch under printing conditions), automatic trapping has not provided acceptable solutions. One root cause is the potential for relatively large registration errors, which requires larger trapping distances, which leads to difficult trade-offs between printability and visual consequences. Human judgment is often needed as the trapping solutions are often 'artistic'. The interactive choices made by a human operator may not be easily mathematically explainable. An estimated 50% of flexo prepress uses some form of manual or human-assisted trapping.

Thus, much advanced trapping is performed by modifying the digital artwork documents, usually by adding extra objects (sometimes called "trapping bananas" because they often have elongated, curved shapes) to the artwork document aligned to the design features, such as shape 15 depicted in FIG. 1D. Some manual trapping methods take into account the specific shapes of objects and the geometric interaction between them. Operators may view a specific situation in a graphic editor, potentially try a classic trapping approach, and then make manual corrections to make the trapped result visually more appealing.

Skilled operators understand that trapping itself may introduce visual artifacts, and therefore involve an aesthetic trade-off as to whether to trap, or not to trap, and in which direction. The optimal trapping choice depends on context and, sometimes, even on personal preference. This is especially true when the misregistration error is higher, as the stakes of the trade-off is higher. Human-assisted trapping is often used on multiple, and often very similar, designs (such variations on product packaging for different markets with different language or legal requirements), which makes the process of trapping costly and challenging to deliver consistent results.

Trapping executed in a software program may work directly with the artwork files, such as a PDF file, in an application such as ArtPro+ from Esko Software BVBA. When the trapping process is started, an algorithm typically analyzes the geometry and colors of the design and identifies edges to differentiate regions with different colors. Once the edges are identified, an expert system may be programmed to determine for every edge if a trap is needed and, if so, which direction is least harmful for the design. In the cases where a trap is created, the software creates a trap object (e.g. banana) along the edge, perfectly aligned to the artwork and with the right color and properties (trapping distance, join type, etc.) and adds it to the artwork file.

Nevertheless, in many cases, human intervention is required in the form of corrections performed manually by an operator. While expert systems may be programmed with rules and/or rule exceptions (e.g. yellow traps always towards other colors), expert systems are typically unable to distinguish aesthetic or semantic subtleties. Accordingly, after the expert system proposes a change, the operator viewing the proposed change in a graphic editor may need to select a different trapping decision. A machine programmed with an expert system or learning algorithm may be able to extrapolate, or the user may dictate, that certain edges or color-combinations should be handled in a single preferred way as a default, but there are often exceptions to such rules.

Other trapping software, or trapping projects, may requiring fully manual trapping, in which the operator decides where to trap and which is the desired direction for every edge. But, manual trapping is time-intensive and demands a skilled operator. And, in commercial reality, designs are typically not created in a single sequence of operations. Several iterations between concept and final print may include corrections and changes. Additionally, each concept may lead to multiple final print designs, catering for different sizes, product variations, languages, legal requirements, etc. When the trapping operation is manual, a design change may cause one or more trapping results to become obsolete, requiring that the trapping be manually redone. For example, traps are typically added where objects touch each other in such a way that a misregistration creates a gap. When one of the objects is moved due a design change, the calculated trap may no longer be valid.

Other prepress operations may face challenges similar to those that requiring trapping, such as the generation of reverse trapping, white underprint, rich black, or spot varnish. In all these situations, the graphic description is changed away from the incoming design in such a way that the design prints more effectively with the intended visual impression. For many such situations, this also often demands human judgment at an object level.

Reverse Trapping (Gapping)

When preparing a file for dry offset printing, such as for example, when printing on metal cans, overprinting inks are typically avoided because wet inks may contaminate each other. Also, adjacent colors are typically separated by a small gap to avoid the slightest misregistration causing the inks to overlap and run into each other. This gap is typically achieved by placing a white "knockout trap" on top of the lighter color of the two adjacent areas, which will have the effect of erasing part of the design. This technique is known as "reverse trapping" or "gapping."

FIGS. 16A and 16B depict an example of reverse trapping. FIG. 16A shows the text "Reverse Trapping" in black color 1602 over a gray background 1604. FIG. 16B shows the trap attached to the letters that creates a white gap 1606 between the lettering and the background color, thus mitigating the impact of any printing misregistration.

Rich Black

Certain regions of the artwork, typically containing already a high percentage of black ink, may be enriched by overprinting one or more additional inks. This is typically done to achieve a darker shade of black than may be possible in view of limited density of the black ink. The area where the enrichment is desired is usually a bit smaller than the corresponding region, because otherwise misregistration will result in displeasing different colors around the region borders. For example, as depicted in FIG. 3, each letter of feature 30 (the word "Text") may have a border 34 of only black ink printed in the B separation, and an enriched area 32 printed with both the B and the C separations. Typically, rich black operations are executed by prepress software that adds new artwork objects to the artwork file (e.g. a shape corresponding to area 32 in the C separation). The new objects are aligned to the design features, with intentional small offsets to ensure the desired results are achieved, even with minor misregistration.

White Underprint

Particularly when printing on clear or metallic substrates, it may be desired to improve the readability and appearance of a design by printing an opaque white ink underneath some objects of the artwork. FIGS. 4 and 5 depict the same graphics with (FIG. 5) and without (FIG. 4) white underprint. For easy verification, the opaque white ink object may be filled with an artificial non-white color (e.g. pink) in the user interface. The opaque white object is usually placed as the topmost object in the document in overprint (even though the white ink separation is likely to be printed first). The area covered by the opaque white object may be slightly bigger or slightly smaller (often referred to, respectively, as spread or choked) than needed to improve the readability of the objects in the artwork.

Spot Varnish

In order to protect the printed design from physical damage and/or give it a more glossy look, an extra separation may be printed with a varnish ink covering all or only selected parts of the design.

Reverse trapping, rich black, white underprint, and spot varnish, although executed as a design intention, add new artwork to the design aligned to other objects, with the goal of improving printability without losing its visual impression. When an original design is changed during the design workflow, these operations also benefit from human judgement.

SUMMARY OF THE INVENTION

One aspect of the invention comprises a computer-implemented method for preparing a digital artwork document for printing. The method includes the steps of displaying, on a computer display, an input digital artwork document for evaluation, and generating, with a computer, a first modified digital artwork document in accordance with a first set of computer-implemented instructions. The step of generating the first modified digital artwork document includes modifying one or more portions of the document to enhance or avoid a physically printed result relating to one or more features of the one or more portions. A first set of digital objects is generated that align to the one or more features of the one or more portions. A second set of computer-implemented instructions, comprising one or more annotated instructions for modifying one or more selected portions of the one or more portions, is interactively received and accepted by the computer. One or more associations, including at least one association between each annotated instruction and each corresponding selected portion of the digital artwork documents, are stored in a computer memory. A second set of digital objects is generated that aligns to the features of the one or more portions in accordance with the first set of computer-implemented instructions and the second set of computer-implemented instructions, including at least one digital object in the second set that is different from the first set. An output digital artwork document including the second set of digital objects and the one or more associations is stored in memory. Each set of instructions may include one or more instructions relating to at least one of: trapping, reverse trapping, or pullback of objects, or providing a rich black feature, a white underprint feature, or a spot varnish feature. The first set of computer-implemented instructions may be generated by a computerized expert system, with the second set of computer-implemented instructions created as an exception to the first set of computer-implemented instructions. At least some of the first set of computer-implemented instructions and the second set of computer-implemented instructions may be hierarchically ordered, such that a hierarchically lower set of instructions overrules a hierarchically higher set of instructions.

In some embodiments, a first output digital artwork document may be created and stored, including creating a modification to the first output digital artwork document in a part of the digital artwork corresponding to the first and second sets of instructions. A second output digital artwork document including the second set of digital objects based upon the first and second sets of computer-implemented instructions may then be automatically regenerated without interactively accepting new computer-implemented instructions corresponding to the modification. Regeneration of the second output digital artwork document may be performed by recalculating parameters for the second set of digital objects only for an affected portion of the first output digital artwork document affected by the modification, and otherwise re-using previously calculated parameters for the second set of digital objects for an unaffected portion of the first output digital artwork document not affected by the modification. In some embodiments, the first output digital artwork document may be a template, and the second output digital artwork document may be an artwork variant made by modifying the template. Methods may include automatically regenerating a plurality of variant output digital artwork documents, each including the second set of digital objects based upon the first and second sets of computer-implemented instructions, without interactively accepting new computer-implemented instructions corresponding to each of the plurality of variant output digital artwork documents created from the same template.

Another aspect of the invention is a computer program product comprising non-transitory instructions readable by a machine, the instructions configured to cause a computer to execute the foregoing methods for preparing a digital artwork document for printing.

Still another aspect of the invention is a computer program product comprising non-transitory instructions readable by a machine, the instructions configured to cause a computer to display, and a printing system to print, a digital artwork document. The instructions comprise instructions for generating, with the computer, a digital artwork document in accordance with a first set of computer-implemented instructions and a second set of computer-implemented instructions. The first set of instructions include one or more portions of the digital artwork document modified to enhance or avoid a physically printed result relating to one or more features of the one or more portions, including a first set of digital objects generated to align to the one or more features of the one or more portions. The second set of computer-implemented instructions comprises one or more annotated instructions for modifying one or more selected portions of the one or more portions, including a second set of digital objects, different than the first set, generated to align to one or more features of the one or more selected portions. The digital artwork document includes one or more associations including at least one association between each annotated instruction and each corresponding selected portion.

Yet another aspect of the invention comprises a computer system configured to execute one or more steps in a printing workflow, the computer system comprising one or more machines programmed with any of the computer program products as described herein. At least a first processor may be in a first geographic location and connected to a second processor in a second geographic location in a computer network, wherein at least some of the method steps are executed by the first processor and others of the method steps are executed by the second processor. The second processor may be a computer server and the first processor may be a client processor configured to request computing services from the second processor.

BRIEF DESCRIPTION OF THE DRAWINGS

FIG. 4 illustrates printed features without a white underprint.

FIG. 5 illustrates the printed features of FIG. 4 with a white underprint.

DETAILED DESCRIPTION OF THE INVENTION

Figure 1A:
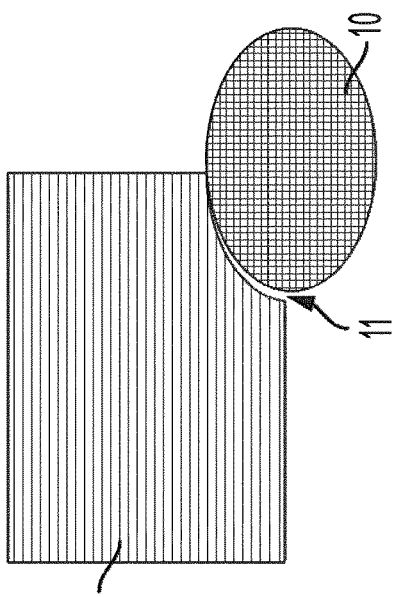
FIG. 1A depicts a cyan rectangle and a yellow circle in an overlapping relationship.
Figure 1B:
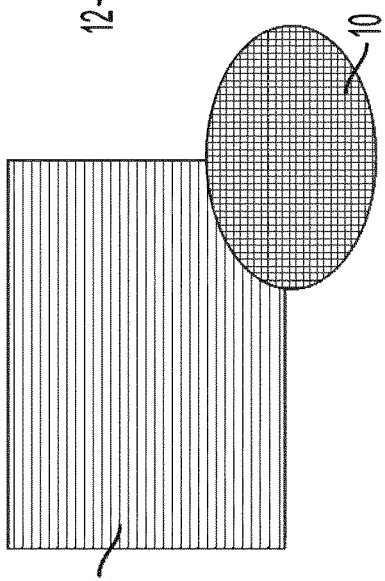
FIG. 1B depicts the same objects of FIG. 1A in which the rectangle has a cutout for accommodating the circle, as those objects appear in the intended design arrangement, or as printed with perfect registration.
Figure 1C:
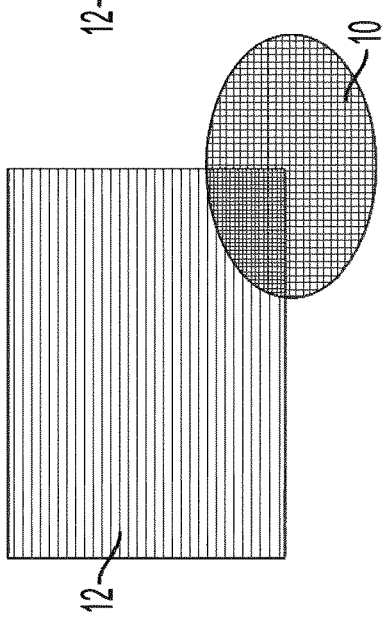
FIG. 1C depicts the objects of FIG. 1B as printed with a degree of mis-registration that causes a perceptible gap between the printed objects.
Figure 1D:
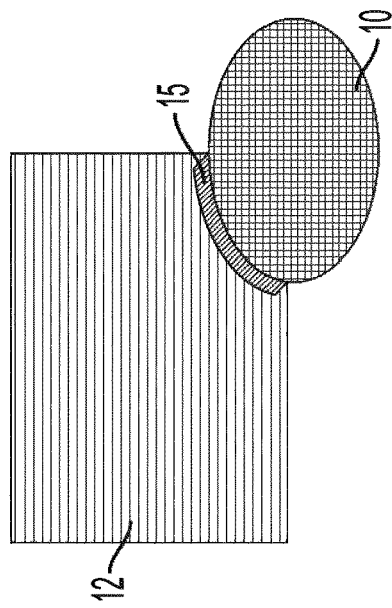
FIG. 1D depicts the objects of FIG. 1B with a trapping object created to fill any gap caused by mis-registration.
Figure 2A:
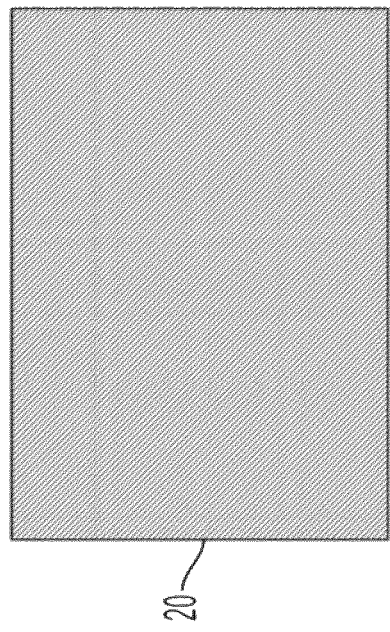
FIG. 2A depicts the design of a green rectangle formed by the yellow and cyan separations, as it appears in a design or as printed with perfect registration.
Figure 2B:
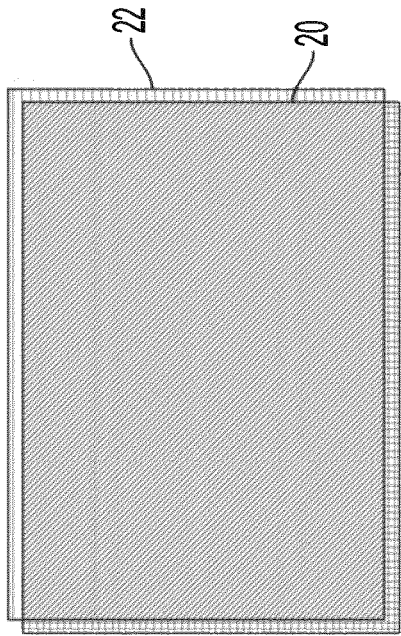
FIG. 2B depicts the design of FIG. 2A as printed with mis-registration between the yellow and cyan separations.
Figure 2C:
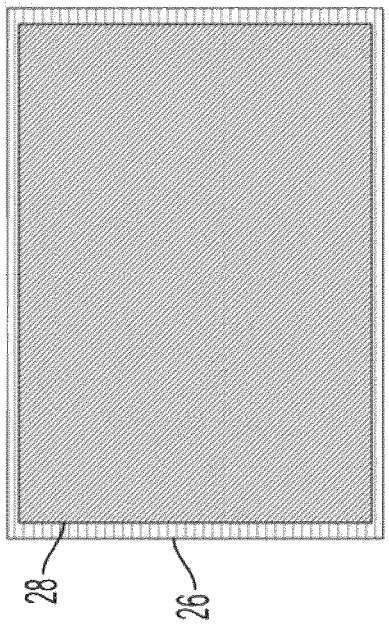
FIG. 2C depicts a modification of the design of FIG. 2A to include a pullback of the yellow separation relative to the cyan separation.
Figure 3:
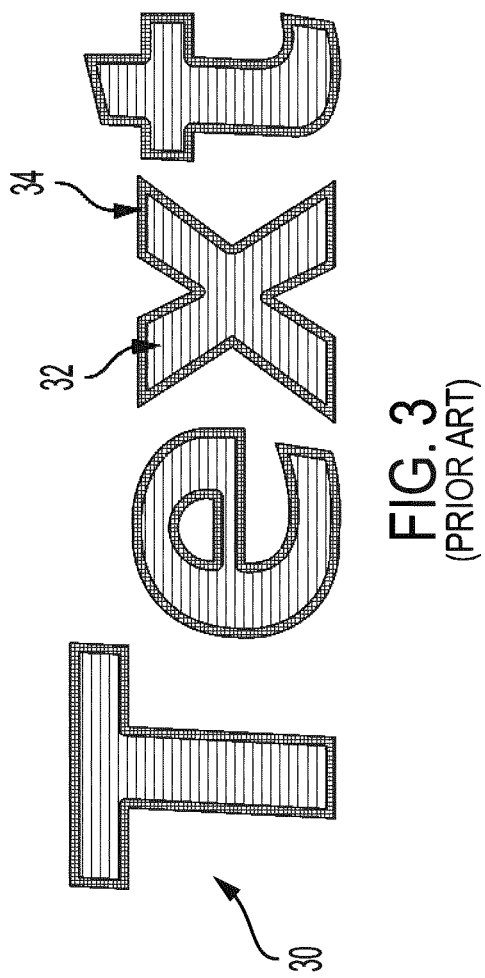
FIG. 3 illustrates features printed with rich black.

Embodiments of the invention include trapping methods and system that permit the trapping engineer's intent (e.g. in the form of documented instructions) to be stored also in the graphic description in association with the calculated trap in such a way that changes to the graphic description lead automatically to changes of the calculated trap. The trapping intent is an annotation to an object saying to a future designer (or the same designer at a later date), in essence, "in case you touch this or surrounding objects, here is the way trapping should be (re)calculated." The trapping intent is attached to graphic objects or sets of graphic objects, in contrast to the imposition of trapping rules that are valid for the entire graphic document, or for a selected page, or for a set of color pairs.

Attaching trapping intent to an object allows recalculating the trap when the object is moved or copied, or when the surroundings of the object (its background or the objects for which it is the background) changes.

The attachment of trapping intent may be done "by example" for later applicability. In preferred embodiments, the trapping engineer works as in a normal manual trapping operation, but his or her operations may be provided as trapping instructions at a higher level that is not just specific to a particular configuration. The software may prompt the operator for additional information, in the style of "when this object does x, do y or z." The answers are then stored and used in subsequent calculation steps. The trapping instructions are preferably stored as an annotation to the object (or group of objects) in the graphic description. The PDF format (the most used format for graphic descriptions) and the Adobe Illustrator® format both allow such annotations. The annotations may also be stored in metadata.

Embodiment of the invention include methods for automatically generating prepress objects for an artwork document, particularly prepress objects that closely align to features of the artwork document, including but not limited to trapping. Multiple instructions are typically provided, each set of instructions associated to a different part of the artwork. The association between instructions and objects are stored within the artwork document, so that modified prepress objects may be automatically generated by performance of these instructions, when the original design is modified.

In one embodiment, a human operator can select parts of the artwork and provide specific prepress instructions that apply only to that part, repeating those steps for various object interactions. The operator may then interactively trigger the software to generate the pre-press objects. If the operator is not pleased with the output, the foregoing steps may be repeated until an acceptable result is achieved. Digital artwork documents, such as Adobe Illustrator files or PDF files have a hierarchical structure (i.e. art objects are organized in layers, groups, subgroups, etc. . . . ). Hence, the term "part" may comprise one or more nodes in this hierarchy. The part instructions may be stored as annotations to the corresponding node(s) in the document. In another embodiment, the nodes may be annotated with an identifier to a set of instructions stored in an external database.

By re-purposing the instructions, stored in the artwork file, fewer manual steps are involved when the prepress objects need to be regenerated. For example, when an object is moved in the artwork, the prepress objects may be updated without operator input. This not only saves operator time, but it also results in more consistency among different versions of a design. Aspects of the invention also provide a powerful way to specify instructions at a correct level. For example, prior art trapping solutions typically only permit the operator to specify instructions on a single edge, or a specific color combination. In one aspect of the invention, an operator may specify instructions for a layer, a group or an object.

As an example, the invention may be applied to generate trapping objects that result in a spread or choke of one or more separations along the edge in the artwork. In a trapping implementation that includes use of a trapping expert system (as known in the field), the invention may permit a user to overrule one or more aspects of the suggestion from the expert system. In a preferred embodiment, the operator uses a graphic editor, such as Adobe Illustrator, as a user interface.

Figure 12:
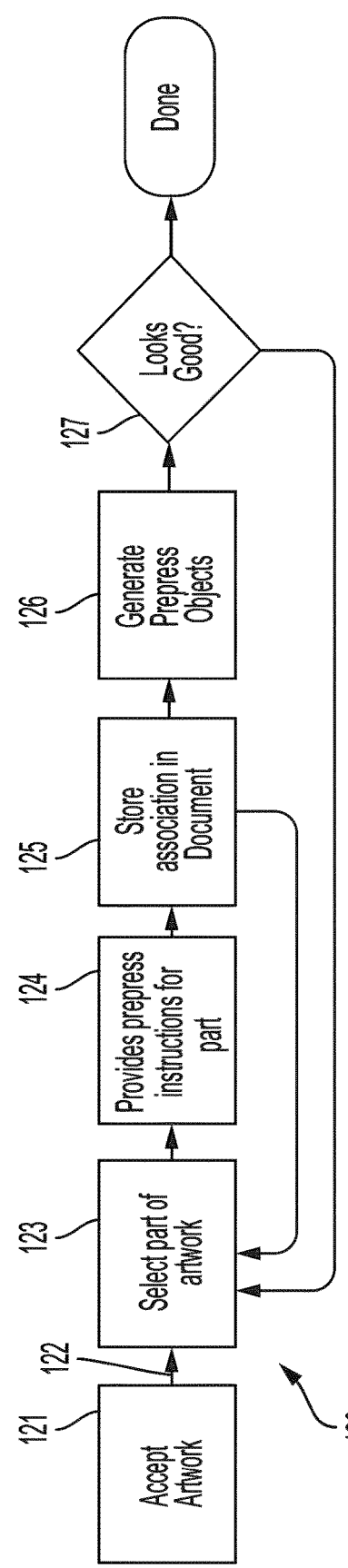
FIG. 12 is a flowchart illustrating an exemplary method in accordance with one aspect of the invention.

An exemplary method in accordance with the invention is illustrated in the flowchart 120 depicted in FIG. 12. In step 121, the operator first accepts the artwork as sufficiently complete to trigger a prepress operation, such as trapping. The operator may then initially use the expert system on the entire artwork using automated instructions in step 122. In the alternative or in addition, an operator may also annotate selected objects before using the expert system. Once the software engine has calculated the prepress objects, such as trapping objects, the operator inspects the results and identifies and selects a corresponding part of the artwork object (not the prepress objects) that needs modification in step 123. The operator annotates the selected part of artwork with modified prepress instructions 124 for the selected parts of the artwork. The system stores the annotations in association with the selected part of the artwork in step 125. Steps 123-125 may be repeated until all identified parts needing modification have been selected and updated with annotations. Once all the annotations have been made, the operator triggers the software to regenerate the trapping objects another time in step 126. This extra check by the operator is helpful to ensure the prepress result is as desired. If the artwork is satisfactory (e.g. looks good) in step 127, no further operations are needed at this time. If not, steps 123-127 may be repeated as many times as necessary. Because all of the annotations are stored in the document, if a re-processing of the job is needed in the future following a modification of the design, the instructions will be remembered and additional manual corrections may not be required.

Trapping Instructions

Exemplary trapping instructions may include the following types of instructions:

Trap/No Trap: Instructions (a) to trap along the edges of the associated part of the artwork, (b) not trap, or (c)

have the expert system make this decision edge-by-edge (e.g. to incur the least visual damage).

Trapping distance: Width of the generated trapping objects.

Trapping direction: Instructions to generate trapping objects (a) in the area next to the edge belonging to the associated object (inwards) or (b) in the area that does not belong to it (outwards), or (c) to have the expert system make this decision (e.g. to incur the least visual damage).

Similarly, exemplary pullback instructions may include:

Pullback/No Pullback: Instructions (a) to execute a pullback operation along the associated part of the artwork, (b) not to execute a pullback operation, or (c) let the expert system decide between (a) or (b) for the associated part of the artwork.

Figure 14A:
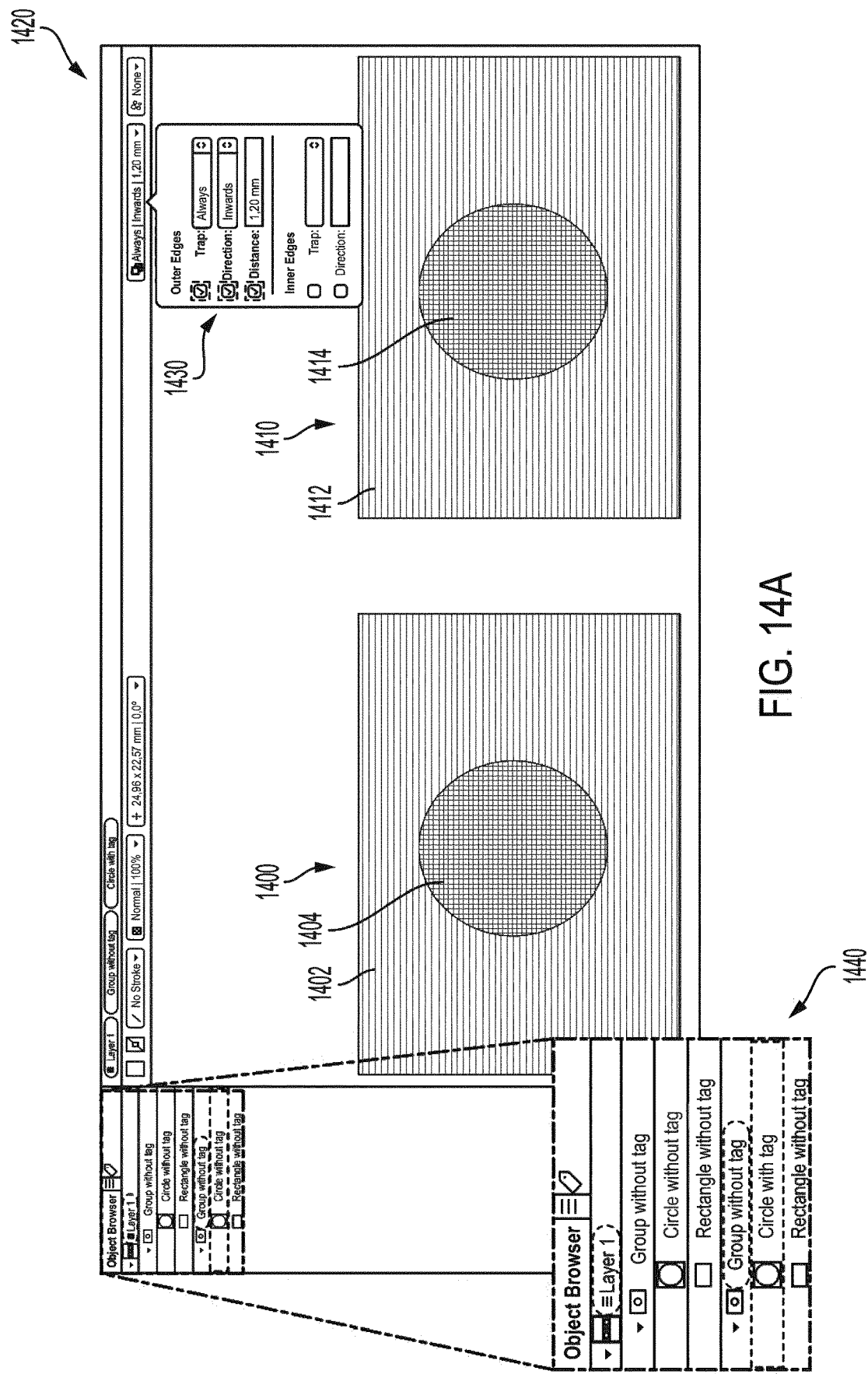
FIGS. 14A-14I depict elements an exemplary user interface for trapping and exemplary trapping objects and groups of objects trapped in accordance with instructions annotated using the user interface.
Figure 14B:
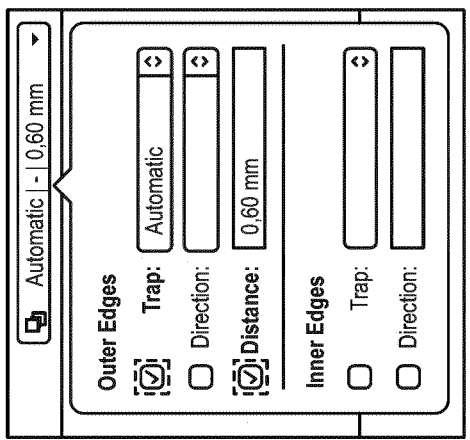
Figure 14C:
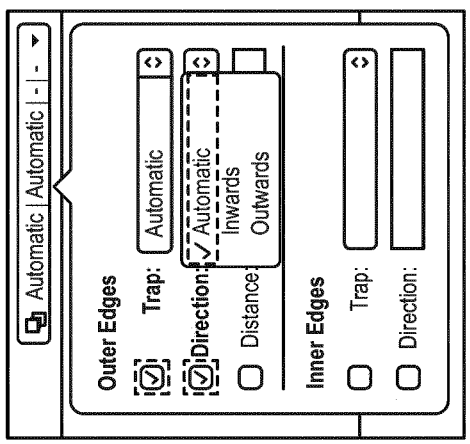
Figure 14D:
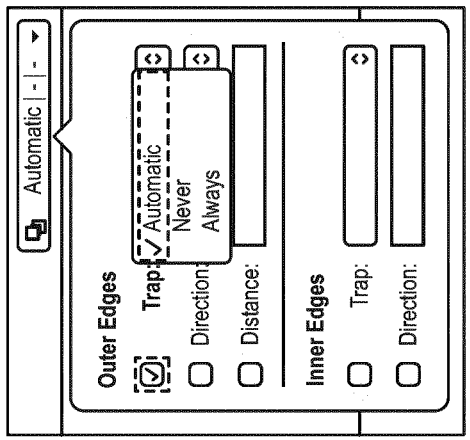
Figure 14E:
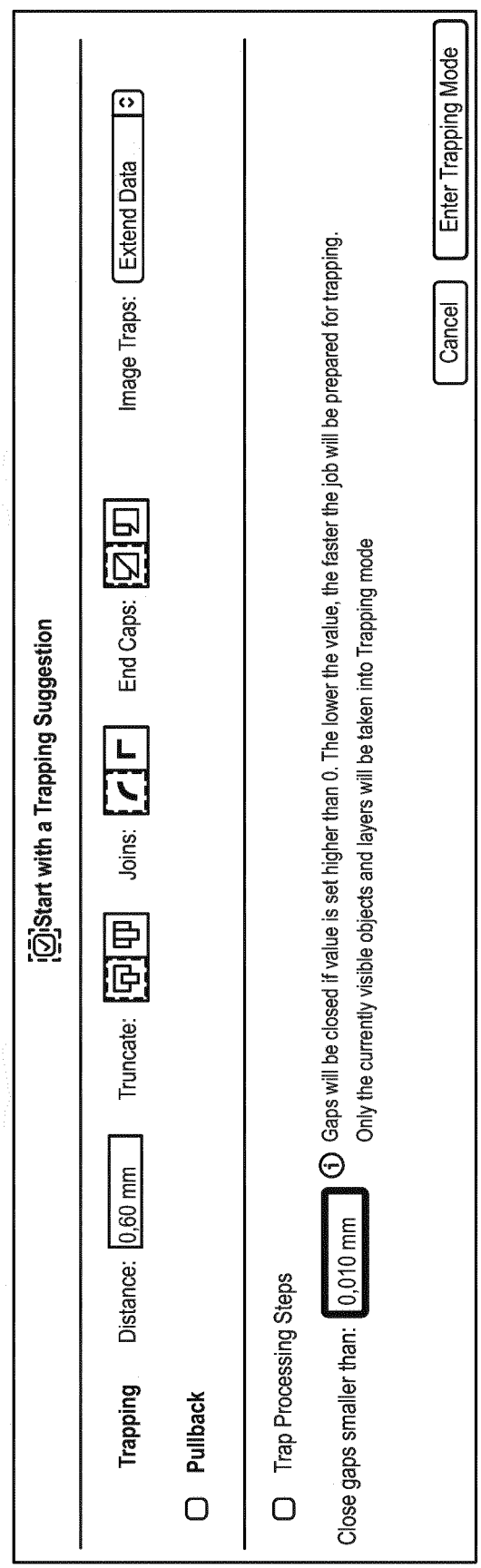
Figure 14G:
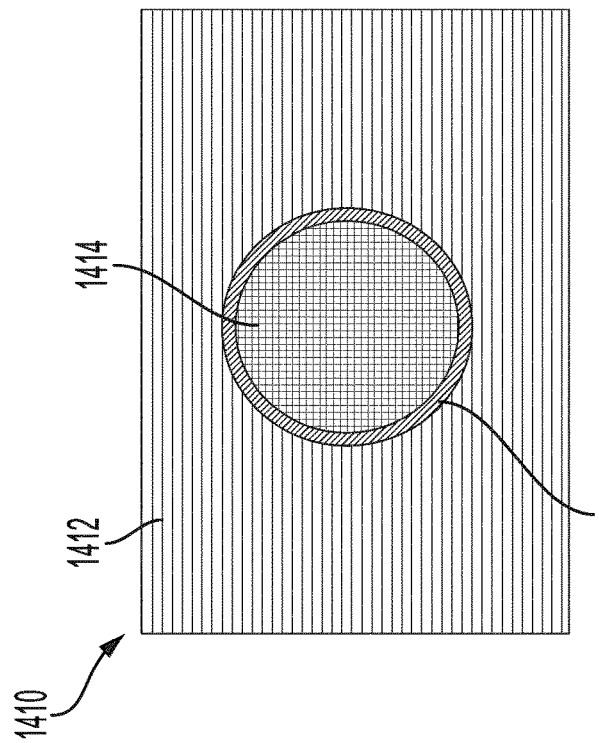
Figure 14I:
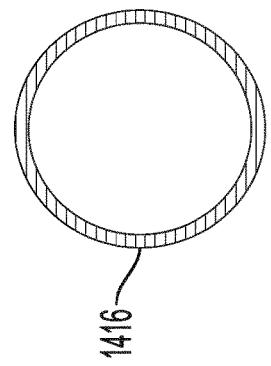
Figure 14F:
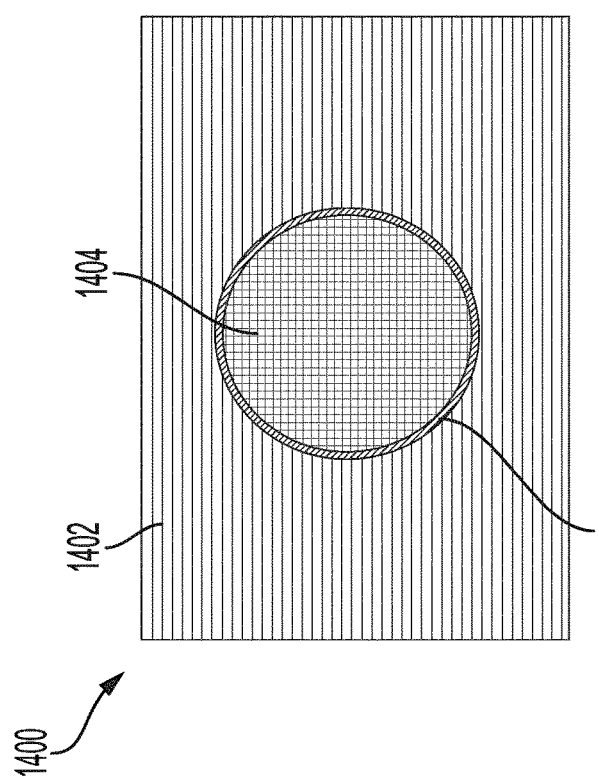
Figure 14H:
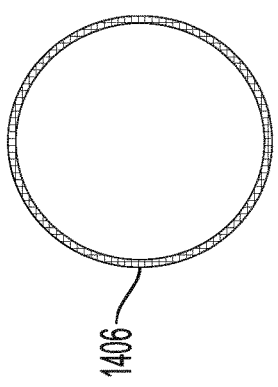

The instructions may include other parameters, such as join style, truncation, end caps, image traps, pullback, as depicted in the exemplary user interface of FIG. 14E, and any other trapping parameters known in the art. Another instruction may include the percentage of the generated trap that should be placed on each side of the edges defining the annotated object. Typically, a full-generated trap may be placed on one side of an edge, but an operator might want to place 30 percent of the trap object towards the outside of the annotated object and 70 percent of the trap towards the inside.

Instructions for pullback may include other parameters, such as the maximum number of inks to pullback and/or which ink(s) to pullback, if present in the tagged object. For example, a particular object colored with two black inks— "Black 1" and "Black 2"—may be given the instruction to always pullback one ink, but letting the expert system decide which black will be pulled back, or it may be annotated to always pullback a specific one of the two inks (e.g. Black 2).

Artwork Association

In one embodiment, the trapping instructions are associated to artwork objects (such as paths, images, text boxes, groups, etc.). Annotations are stored in the document either by a value or by reference. "By reference" means the object itself holds just an index to a list of instructions stored elsewhere in the document or a reference to instructions stored separately. Furthermore, the artwork document may contain one default set of trapping instructions to be used for objects that do not have an explicit annotation.

Figure 6:
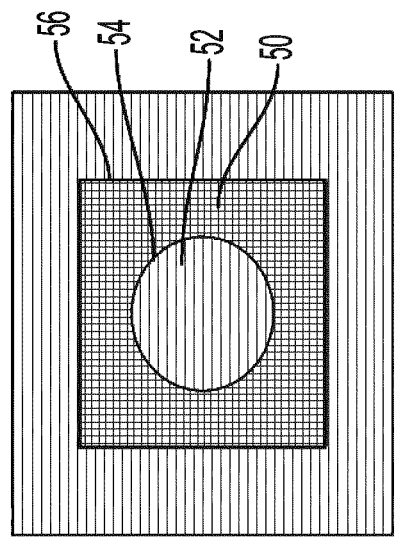
FIG. 6 illustrates a group of objects having inner and outer edges.

For clarity in connection with the following example, the difference between inner and outer edges is illustrated in FIG. 6. An inner edge of a group or an object is an edge between two areas that both fall inside that group or object. An outer edge is an edge for which one and only one of the two areas belongs to the mentioned group or object. For example, as depicted in FIG. 6 in which yellow square 50 and blue circle 52 form a group object together, border 54 of the circle is an inner edge of the group while border 56 of the yellow square is an outer edge.

Figure 7:
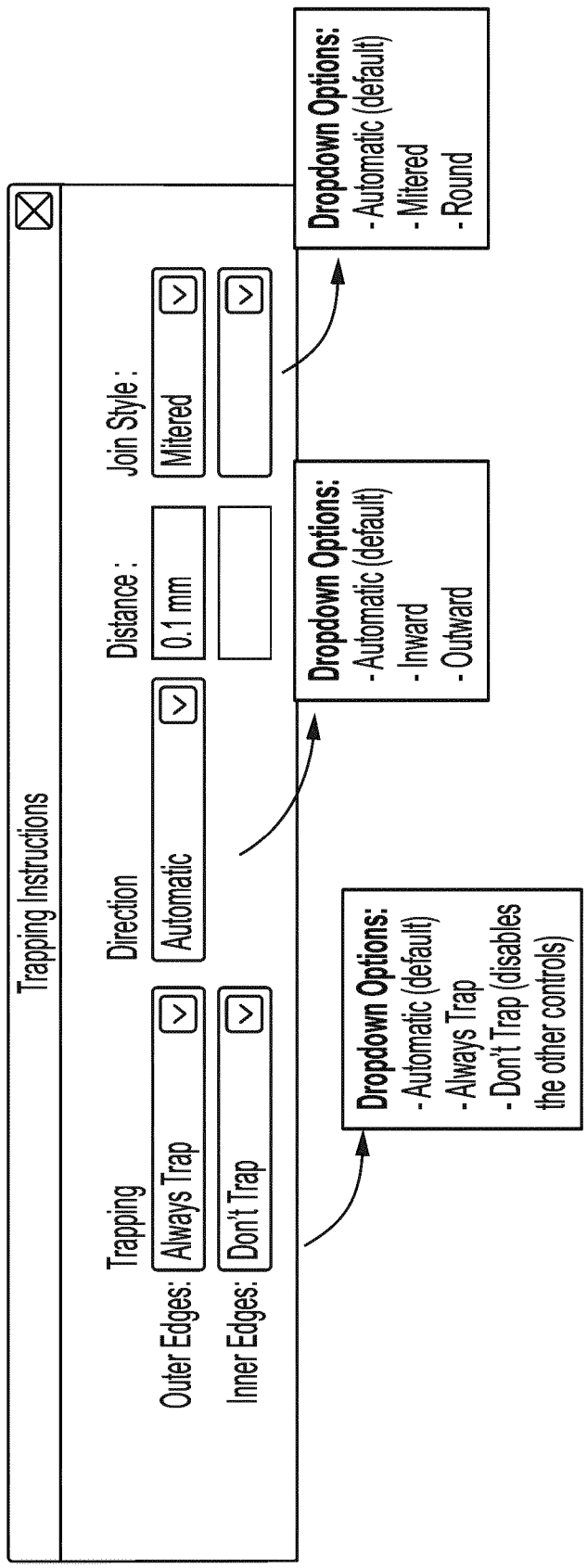
FIG. 7 illustrates an exemplary user interface with options selected for providing a first set of annotated trapping instructions.
Figure 8B:
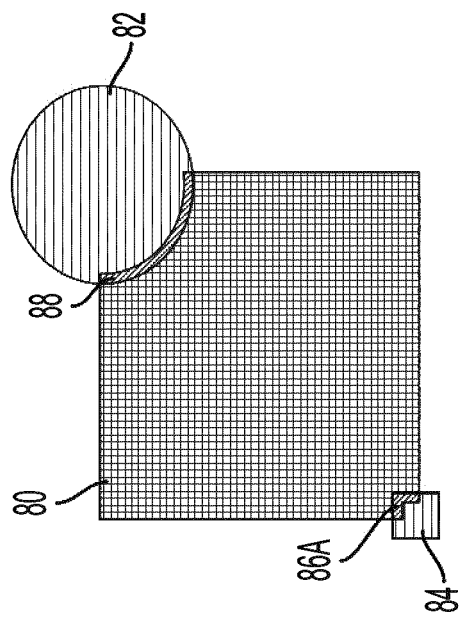
FIGS. 8A-8C illustrate a group of objects before and after execution of various trapping instructions.
Figure 8C:
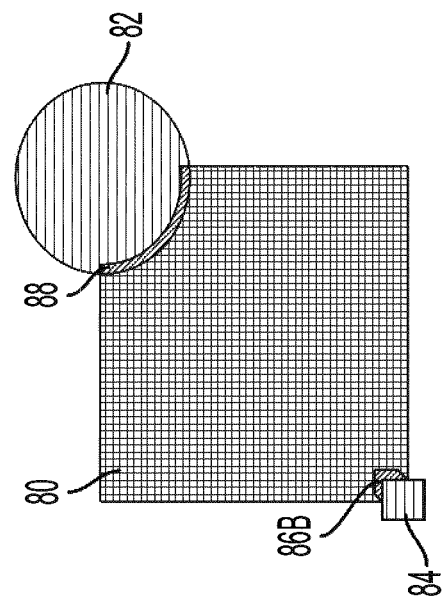
Figure 8A:
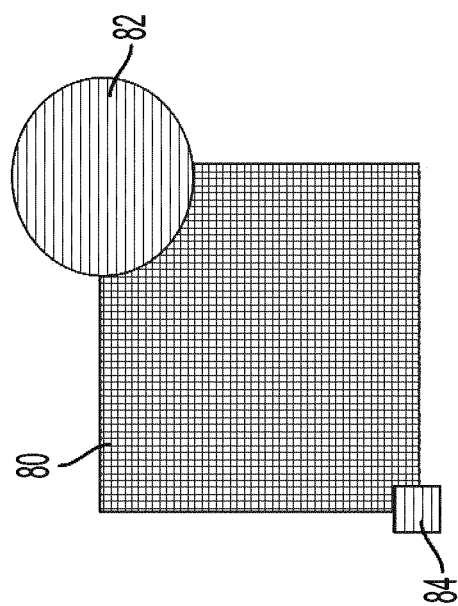
Figure 9C:
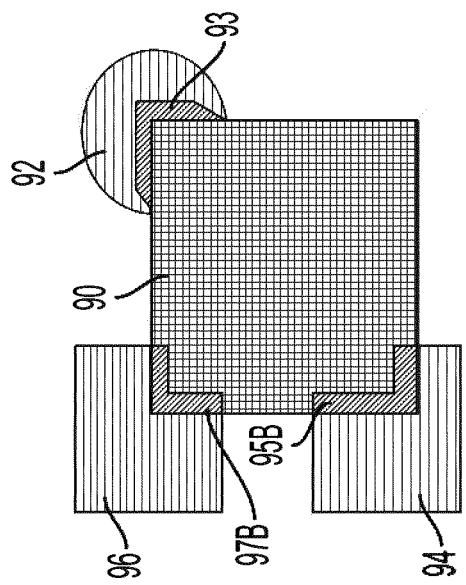
FIGS. 9A-9C illustrate another group of objects before and after execution of various trapping instructions.
Figure 9B:
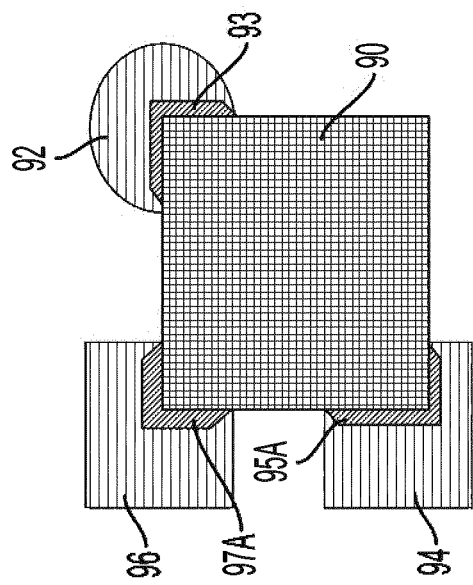
Figure 9A:
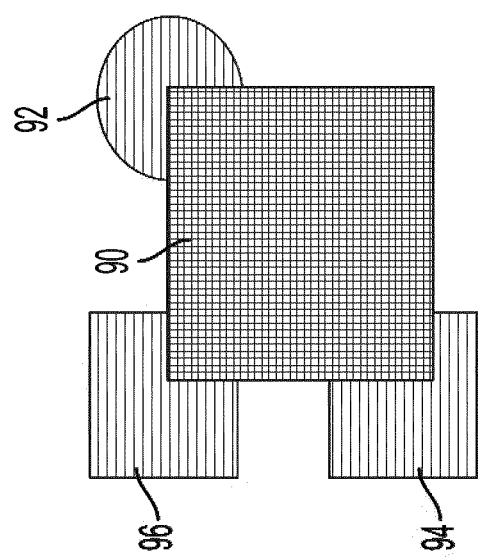

In one embodiment, the operator may use selection tools of the document editor to select objects, and then inspect or change the instructions in a dialog such as is depicted in the user interface of FIG. 7. In this embodiment, the term "Automatic" refers to relying on the expert system. In the exemplary user interface, the setting for "Direction" is not available for inner edges, because this may be too dependent upon specific object interactions to specify the direction in a default instruction.

When the algorithm executes the instructions, some conflicts between instructions on overlapping objects and/or objects sharing edges may occur that need to be resolved.

For example, two objects may share an edge that have stored instructions to trap outwards. Different solutions may be used for overcoming this problem. In a first embodiment, the software may make use of the Z-order (from top to bottom or vice versa) of the objects to prioritize the order in which the instructions are considered and obeyed.

In another embodiment, different trapping instructions may be associated with different separations of the artwork document (instead of associated with specific objects). For example, if the artwork is to be printed as a combination of offset printing and flexographic printing, the invention may be used to assign a larger trapping distance to all edges that involve flexo separations, thereby accommodating for the larger registration error with flexo.

In some situations, one set of trapping instructions may be associated with two artwork objects (instead of one), thereby providing instructions that apply specifically to the visible edge between those two objects. This allows the operator to provide fine-grained exceptions. This type of situation may require no distinction between inner and outer edges.

Hierarchical Instructions

Aspects of the invention may include cascading instructions with respect to the hierarchical structure of the digital artwork document in which objects are organized in layers, group, subgroups, etc. Exemplary embodiments of the invention may allow prepress instructions to be associated to any node at any level in the hierarchy, and/or allow instructions to be only partially defined (except for the instructions associated to the top-level object). When generating the prepress objects for a given object, the exemplary software follows the instructions associated to that object. If the instructions are not fully specified, then the software will look for the instructions of its parent (e.g. a subgroup, a group, or the document as a whole) to fill in the missing elements. This search for further instructions upstream in higher levels is continued until a full set of instructions has been assembled. Thus, when the trapping engine is running its algorithm to create the trapping objects, it will encounter an edge and look for a (possible) specific instruction associated with the object(s) that defined this edge. When using hierarchic instructions, all but the topmost instructions may have empty parameters. If the instructions for objects have no values for some parameters, the trapping engine will look for the associated instructions of the parent to fill those settings. The whole hierarchical tree will be checked step by step, from bottom to top level, until all parameters are set for the object and the trapping objects can be created.

For example, in one implementation for trapping an edge, the steps may be performed as follows:

Initialize a set of trapping parameters (hereinafter identified as "TI" for labeling purposes) with all empty values;

Identify the objects (deepest level nodes) that defined this edge;

For every of those identified object (in Z-order, front to back):
  If the node is annotated with instructions:
    Determine if the edge is inner or outer to that node and only consider that part of the annotated instructions
    Partially copy those instructions to TI, whereby not overwriting non-empty parameters in TI.
  Go one node up in the hierarchy and repeat the previous step Fill in the remaining empty parameters in TI with the generic trapping instructions.

Trap the edge according to TI.

Figure 15A:
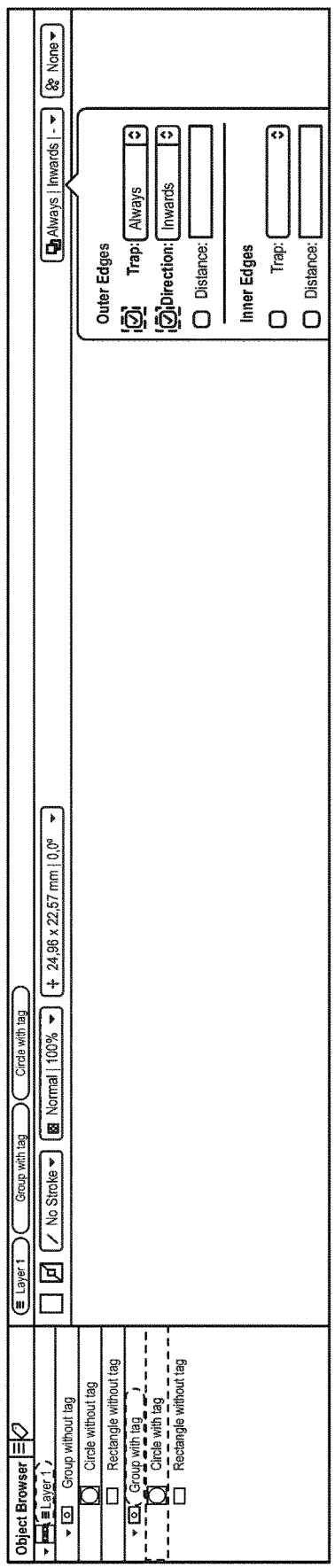
FIGS. 15A-15D depict the elements of the exemplary trapping user and groups of objects trapped in accordance with instructions annotated using the user interface.
Figure 15B:
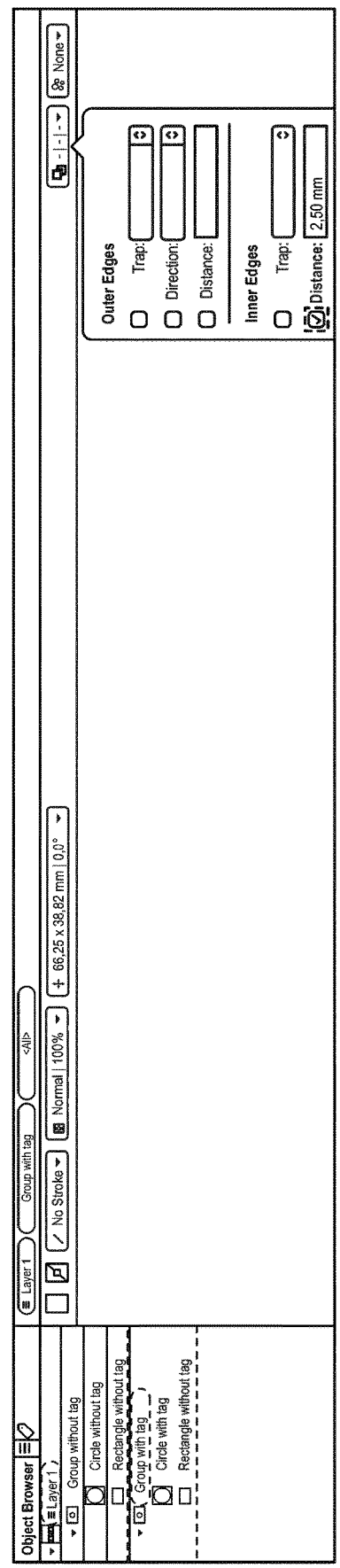
Figure 15D:
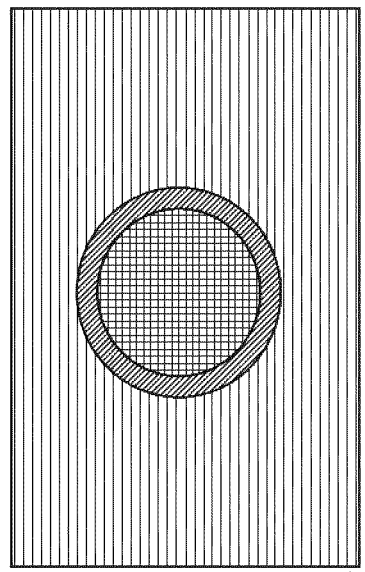
Figure 15C:
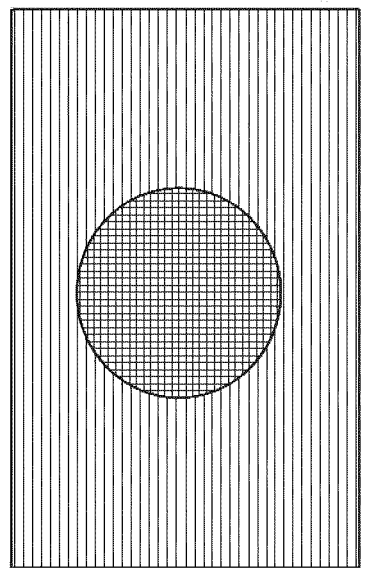

FIGS. 15A-15D illustrate an example for inheriting instructions. In the example, the right-side group is annotated at the group level to instruct the group to use a width of 2.5 mm for every generated trapping object aligned to its inner edges, as illustrated in FIG. 15B, and the right-side yellow circle is annotated to instruct its outer edges to always be trapped inwards, as illustrated in FIG. 15A. The left-side group, depicted in FIG. 15C, is trapped with the general parameters (yellow into cyan, trapping distance 0.6 mm). The edge defining the right-side circle is both an outer edge for the circle and an inner edge for the group. The trap is performed from cyan to yellow, honoring the annotation on the circle and, because no trapping distance is stored in the annotation of example 15.A, the 2.5 mm trapping distance cascades down from the annotation of the parent group, as depicted in the resulting trapped group shown in FIG. 15D, as compared to the left side group trapped with the general parameters (trapping distance 0.6 mm) as depicted in FIG. 15C.

Reverse Trapping (Gapping)

Figure 16A:
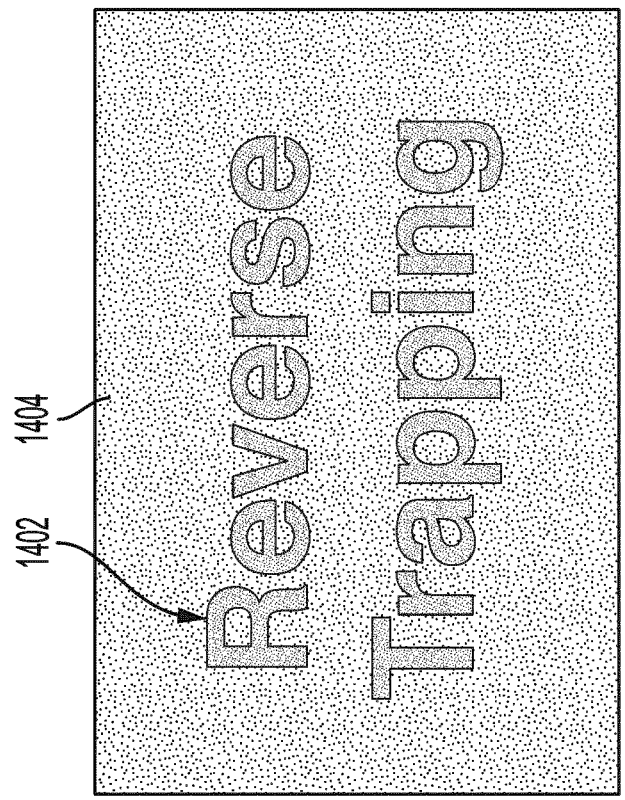
FIG. 16A depicts an example of text without reverse trapping.
Figure 16B:
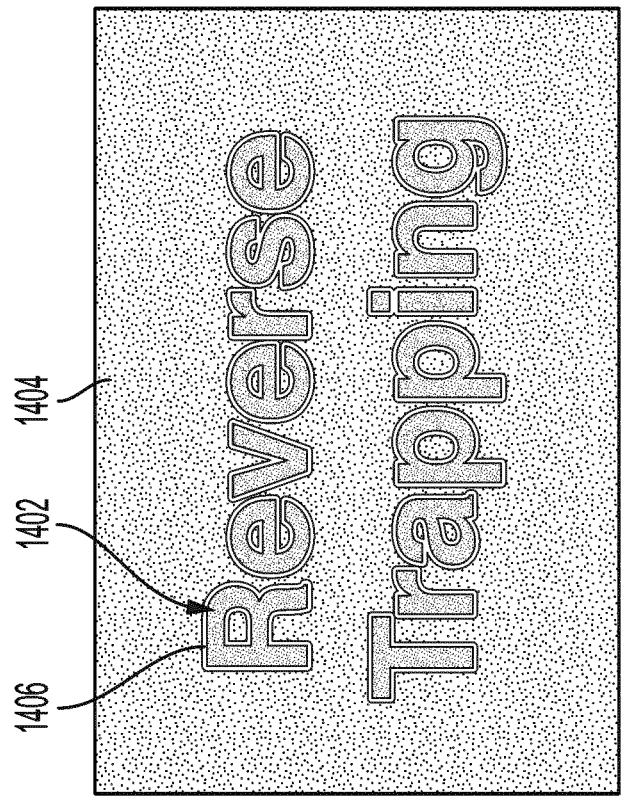
FIG. 16B depicts an example of the text of FIG. 16A, with reverse trapping

Similar to the operations for trapping, aspects of the invention are applicable to generate reverse trapping gap objects such as gap 1606 in FIG. 16B. Instructions for reverse trapping may include a distance corresponding to the width of the gap.

Rich Black

Similar as for trapping, embodiments of the invention may be applied to generate extra objects in overprint, resulting in updated colors of existing objects in the artwork. For example, instructions for Rich Black may include a condition regarding whether the object contributes to the rich black area. In one embodiment such a condition can be based on the contributing separations and their intensity for that object. The instructions for Rich Black may also, for example, include a choke distance for the rich black area.

Figure 10B:
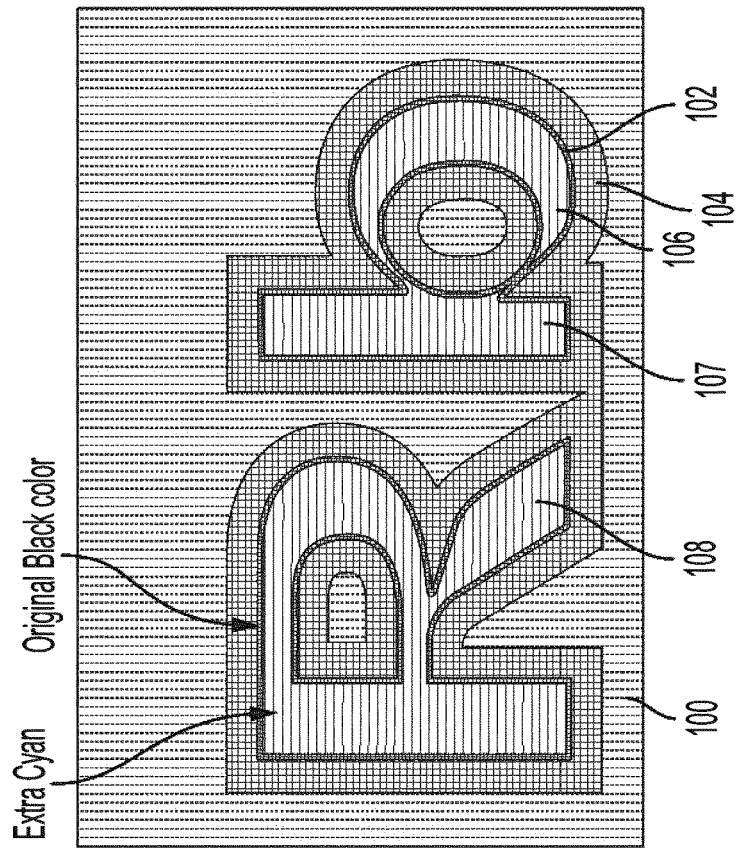
FIGS. 10A and 10B illustrate text features with and without execution of rich black instructions.
Figure 10A:
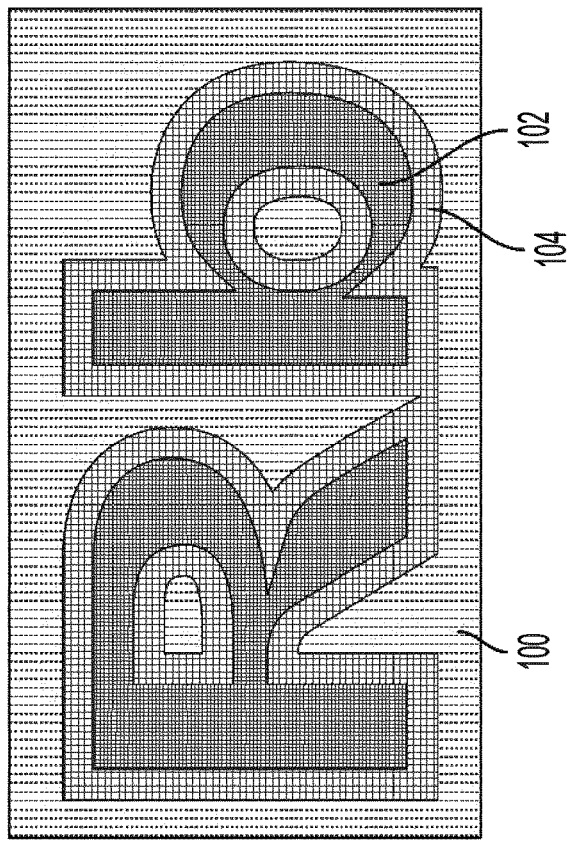

Referring now to FIG. 10A, there is illustrated a set of objects for which rich black may be desired. The objects comprise a magenta background rectangle 100, black text 102, and a yellow shadow 104 around the black text. The instructions for creating rich black may include objects 106, 107, 108 in the cyan separation to be printed over the black objects. Each object 106, 107, 108 may have a choke distance that leaves a border where only black text 102 is visible beyond the enriching cyan objects.

White Underprint

Similar to operations for trapping, aspects of the invention are applicable to the generation of objects in an opaque white separation printed as first separation to improve readability and appearance of a design printed on certain types of substrates (e.g. transparent or metallic). When the white underprint is exactly as big as the printing surface, it can often be calculated automatically from the areas of print. There are aesthetic and technical reasons why a different size may be desired, however. One example is when an intentionally larger white area is desired to be visible as white. Such "white underprint intent" may be stored as an annotation that can be re-applied when the objects to which the underprint is linked change, scale, move or disappear.

Figure 11C:
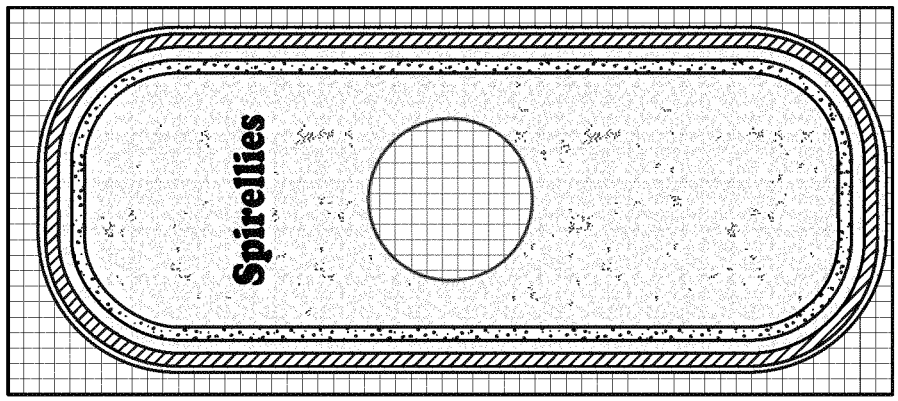
FIGS. 11A-11C illustrate a group of objects with annotated white underprint instructions.
Figure 11B:
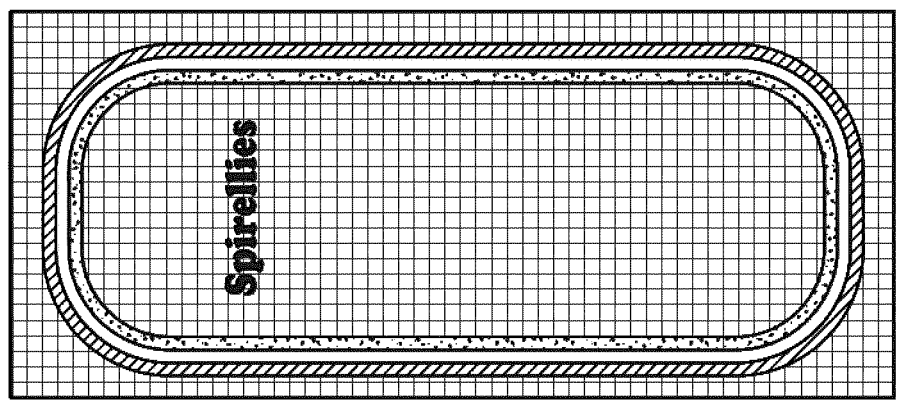
Figure 11A:
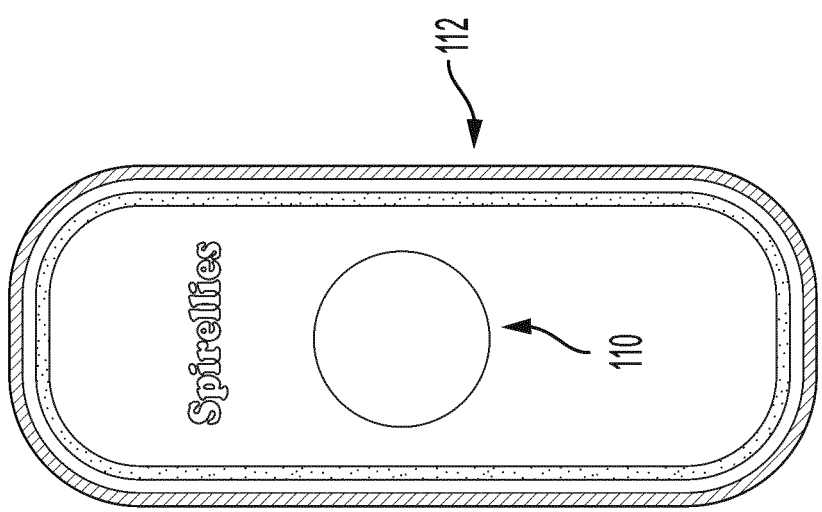

Instructions for white underprint may include considerations relating to whether the underprint object will contribute in a positive or negative way to the generated object and a spread or choke distance. For example, as depicted in FIG. 11A, circle 110 contributes to the white underprint in a negative way (e.g. no white underprint is desired within the boundary of the circle), whereas the outline 112 contributes to the white underprint in a positive way (e.g. outline 112 shows the outer boundary of the white underprint), which typically also includes a desired spread distance. FIG. 11B depicts the artwork in standard printing colors (e.g. CMYK) in which the gray checkered background is represents non-printing area. FIG. 11C depicts the artwork of FIG. 11B combined with the white underprint information, in which an artificial (non-printing) hue (e.g. pink, depicted in a shade of grayscale in FIG. 11C) may be displayed in the areas where white ink will print. The exemplary instructions thus result in creation of a see-through window corresponding to the geometry of object 110 in the label when printed on a transparent substrate.

Spot Varnish

Aspects of the invention may also be applied to generate a spot varnish in specific areas of the artwork. Referring back to the rich black example as depicted in FIGS. 10A and 10B, for example, if instead of (or in addition to) printing objects 106, 107, 108 in cyan to create rich black in the designated areas, similar objects may be associated with instructions for printing a spot varnish as an additional separation after printing the CMYK separations.

Workflow Examples

Understanding of aspects of the invention may be enhanced by consideration of some exemplary workflows.

Interactive Trapping

In an interactive trapping embodiment using a graphic editor (e.g. a computer programmed with instructions for visualizing and editing artwork in a document), the operator first adds instructions to trap the entire document according to preprogrammed instructions corresponding to a trapping expert system. The operator then inspects the results. In areas where the operator does not like the suggested trapping, the operator annotates the corresponding object(s) with updated instructions. The operator then triggers the software to re-trap, and repeats the foregoing steps until a satisfactory result is achieved.

Offloaded Trapping

Complex files may take several minutes to trap. To avoid an operator having to wait for the trapping calculation, aspects of the invention may be configured to permit offloading to a server. For example, after an artwork file has been automatically trapped on an automation server, the operator opens it on a workstation and inspects the result. If the result is not entirely correct, the operator annotates the file with the necessary instructions, and sends the document (along with the instructions and associations) back to the automation server to perform a re-trapping operation with the updated instructions.

Re-Trap after a Small Change

Aspects of the invention may be particularly useful for responding to design changes. In a situation in which the artwork has been trapped as described previously herein and a small design change is requested (e.g. an artwork object is moved), the operator performs the requested artwork change and triggers a re-trap (or it is triggered automatically by the change). Because all special instructions are annotated in the artwork file, no further input is needed from the operator for such a small change. In one embodiment, the re-trapping may be optimized to only update the trap objects in the vicinity of the changed artwork.

Select & Tag Automation

Some embodiments of the invention may permit a prepress operator to build an automation script configured to select parts of the artwork based on color, shape, size, name, or other criteria, similar to selection tools existing in graphic editing scripting languages (such as PDF Action Lists from Esko). An automation script may also provide specific instructions for specific parts of the artwork and store these in the document. The script can repeat these steps, and also provide instructions for the rest of the artwork. The script may trigger the creation of the prepress objects. Such a script may be executed on multiple similar artwork documents, thereby requiring less manual work.

Annotated Template

A proliferation in variants in packaging (flavor, language, size, promotions, etc.), had led to a large number of artwork documents all requiring prepress attention before they can be printed. Typically, however, these artwork documents can have a lot in common.

Brands often use templates to manage certain variants (e.g. language or flavor). The variants may be created from a template by hiding/showing certain parts of the template or by replacing content (such as the text) in one variant relative to another. These operations may be performed automatically or manually.

Using embodiments of the invention, a prepress operator may only need to provide instructions for a template document. If variants are made from the template using tools or processes that enable persistence of the instructions, prepress objects may be automatically generated for all the variants in accordance with those instructions. This may save a substantial amount of prepress operator time, and make it easier to achieve more consistency among the variants.

Figure 13:
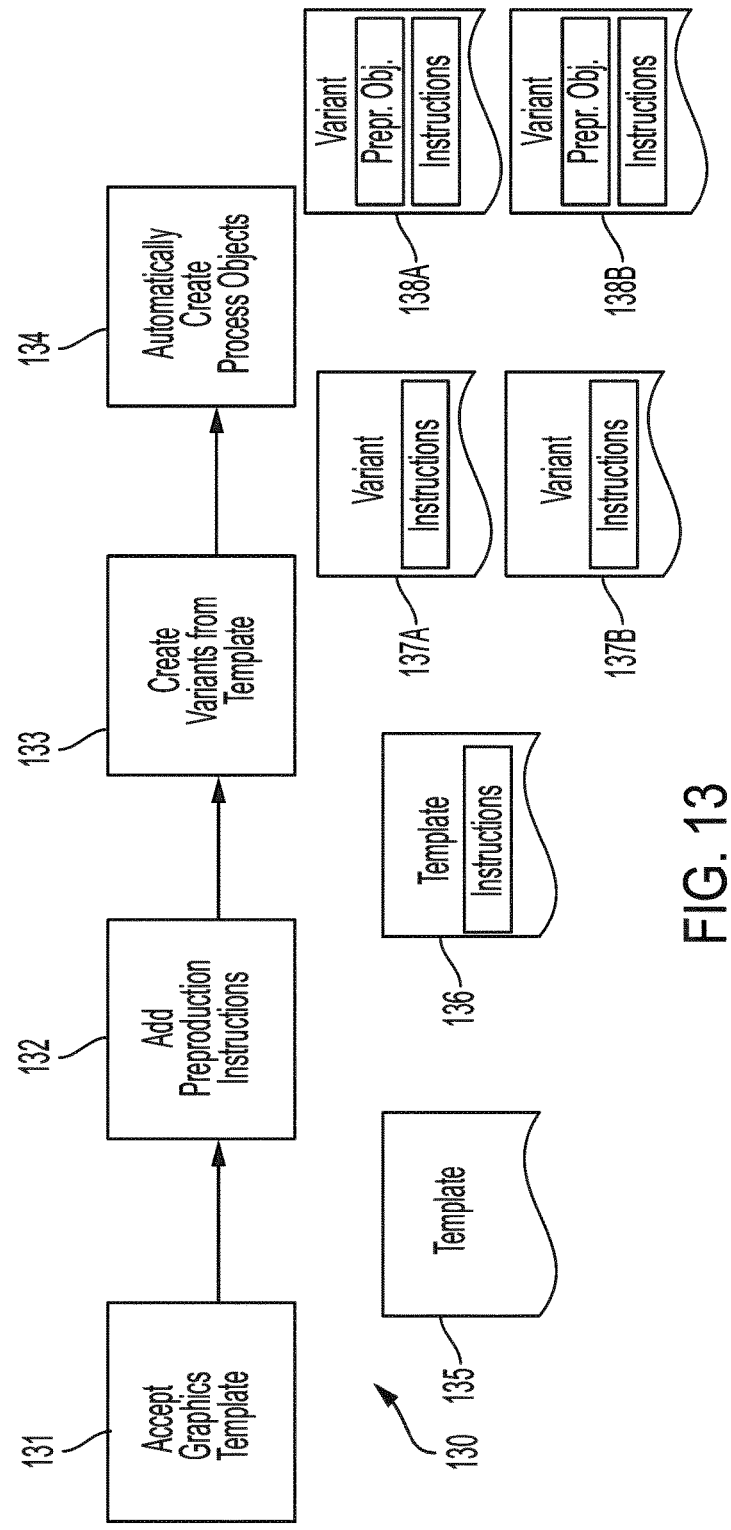
FIG. 13 is a flowchart illustrating another exemplary method in accordance with one aspect of the invention.

A flowchart 130 corresponding to this embodiment is depicted in FIG. 13. In step 131, the operator accepts a graphics template 135 embodying the artwork to be used in all variants. In step 132, preproduction instructions, such as for trapping, rich black, white underprint, spot varnish, reverse trapping, etc. are added to the template as described herein, thus creating annotated template 136. One or more variants 137A, 137B of the template are created in step 133. Each of those template variants may then be processed in step 134 to generate prepress objects contained in modified variants 138A, 138B.

Trapping Annotation

The annotations as referred to herein may include any way of annotating a document or a portion of a document with information, such as storing a link between an object and its prepress (e.g. trapping) parameters. The prepress information may be directly embedded with the object (PDF annotation) or stored as a reference to indexed information stored elsewhere, or the link may be further externalized (e.g. put on a group of objects or in an index of objects). When an object has no annotation, it is assumed to have the "default" trapping rule, which may be explicitly stored in the page description or assumed (e.g., the default may be no trapping, a system default trapping, or the page general trapping).

Computer Systems and Files

Although not limited to any particular computer system or implementation, the functionality as described herein may be implemented in a version of Esko ArtPro+. One suitable computer processor capable of running ArtPro+ 18.1 is an Apple computer running at least Mac OS 10.12, with a Mac Intel processor, a minimum of 4 GB RAM (8 GB RAM recommended), connected to the Internet via a 10/100/1000 Base-T Ethernet, TCP/IP v4 protocol connection, and connected to a display having at least 1280×1024 resolution, with true color depth. Another suitable computer processor capable of running ArtPro+ 18.1 is a computer running a Windows operating system 8, 8.1, or 10 (Pro or Enterprise), 7 or 7 SP1 (Professional, Enterprise, or Ultimate) with an x64 (64-bit) compatible dual-core processor (Intel or AMD), minimum dual-core, minimum 4 GB RAM (8 GB RAM recommended). ArtPro+ is a native PDF editor, and thus exemplary files containing the annotations and instructions may be PDF files. The foregoing are merely examples of systems, and systems with greater or lesser technical requirements, and different file structures, may be suitable for implementing various aspects of the invention.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A computer-implemented method for preparing a digital artwork document for printing, the method comprising the steps of:
   a) displaying, on a computer display, an input digital artwork document for evaluation;
   b) generating, with a computer, a first modified digital artwork document in accordance with a first set of computer-implemented instructions generated by a computerized expert system that include modifying one or more portions of the digital artwork document to enhance or avoid a physically printed result relating to one or more features of the one or more portions, including generating a first set of digital objects that align to the one or more features of the one or more portions;
   c) interactively accepting, with the computer, a second set of computer-implemented instructions created as an exception to the first set of computer-implemented instructions comprising one or more annotated instructions for modifying one or more selected portions of the one or more portions;
   d) storing in a computer memory one or more associations including at least one association between each annotated instruction and each corresponding selected portion;
   e) generating a second set of digital objects that aligns to the features of the one or more portions in accordance with the first set of computer-implemented instructions and the second set of computer-implemented instructions, including at least one digital object in the second set that is different from the first set;
   f) storing an output digital artwork document including the second set of digital objects and the one or more associations;
   wherein each of the first set of computer-implemented instructions and the second set of computer-implemented instructions includes one or more instructions relating to at least one of: trapping of objects, reverse trapping of objects, pullback of objects, providing a rich black feature, providing a white underprint feature, or providing a spot varnish feature; and
   wherein the computerized expert system is configured to analyze geometry and colors of the digital artwork, identify edges, identify a subset of edges that need to be trapped, and for each edge in the identified subset of edges, determine a trapping direction, create a trap object, and add the trap object to the digital artwork document.

2. The method of claim 1, wherein at least some of the first set of computer-implemented instructions and the second set of computer-implemented instructions are hierarchically ordered, such that a hierarchically lower set of instructions overrules a hierarchically higher set of instructions.

3. The method of claim 1, comprising creating and storing a first output digital artwork document, creating a modification to the first output digital artwork document in a part of the digital artwork corresponding to the first and second sets of instructions, and automatically regenerating a second output digital artwork document including the second set of digital objects based upon the first and second sets of computer-implemented instructions, without interactively accepting new computer-implemented instructions corresponding to the modification.

4. The method of claim 3, comprising regenerating the second output digital artwork document by recalculating parameters for the second set of digital objects only for an affected portion of the first output digital artwork document affected by the modification, and otherwise re-using previously calculated parameters for the second set of digital objects for an unaffected portion of the first output digital artwork document not affected by the modification.

5. The method of claim 3 wherein the first output digital artwork document is a template, and the second output digital artwork document is an artwork variant made by modifying the template.

6. The method of claim 5, comprising automatically regenerating a plurality of variant output digital artwork documents, each including the second set of digital objects based upon the first and second sets of computer-implemented instructions, without interactively accepting new computer-implemented instructions corresponding to each of the plurality of variant output digital artwork documents created from the same template.

7. A computer program product comprising non-transitory instructions readable by a machine, the instructions configured to cause a computer to execute a method for preparing a digital artwork document for printing, the method comprising the steps of:
   a) displaying, on a computer display, an input digital artwork document for evaluation;
   b) generating, with the computer, a first modified digital artwork document in accordance with a first set of computer-implemented instructions generated by a computerized expert system that include modifying one or more portions of the digital artwork document to enhance or avoid a physically printed result relating to one or more features of the one or more portions, including generating a first set of digital objects that align to the one or more features of the one or more portions;
   c) interactively accepting, with the computer, a second set of computer-implemented instructions created as an exception to the first set of computer-implemented instructions comprising one or more annotated instructions for modifying one or more selected portions of the one or more portions;
   d) storing in a computer memory one or more associations including at least one association between each annotated instruction and each corresponding selected portion;
   e) generating a second set of digital objects that aligns to the features of the one or more portions in accordance with the first set of computer-implemented instructions and the second set of computer-implemented instructions, including at least one digital object in the second set that is different from the first set; and
   f) storing an output digital artwork document including the second set of digital objects and the one or more associations;

wherein each of the first set of computer-implemented instructions and the second set of computer-implemented instructions includes one or more instructions relating to at least one of: trapping of objects, reverse trapping of objects, pullback of objects, providing a rich black feature, providing a white underprint feature, or providing a spot varnish feature; and wherein the computerized expert system is configured to analyze geometry and colors of the digital artwork, identify edges, identify a subset of edges that need to be trapped, and for each edge in the identified subset of edges, determine a trapping direction, create a trap object, and add the trap object to the digital artwork document.

8. The computer program product of claim 7, wherein at least some of the first set of computer-implemented instructions and the second set of computer-implemented instructions are hierarchically ordered, such that a hierarchically superior set of instructions overrules a hierarchically inferior set of instructions.

9. The computer program product of claim 7, wherein the instructions are configured to permit a user to create and store a first output digital artwork document, create a modification to the first output digital artwork document in a part of the digital artwork corresponding to the first and second sets of instructions, and automatically regenerate a second output digital artwork document including the second set of digital objects based upon the first and second sets of computer-implemented instructions, without the computer requiring the user to interactively provide new computer-implemented instructions corresponding to the modification.

10. The computer program product of claim 9, wherein the instructions are configured to regenerate the second output digital artwork document by recalculating parameters for the second set of digital objects only for an affected portion of the first output digital artwork document affected by the modification, and to otherwise re-use previously calculated parameters for the second set of digital objects for an unaffected portion of the first output digital artwork document not affected by the modification.

11. The computer program product of claim 9, wherein the instructions are configured to create the first output digital artwork document as a template, and to create the second output digital artwork document as an artwork variant comprising modifications to the template.

12. A computer system configured to execute one or more steps in a printing workflow, the computer system comprising one or more machines programmed with the computer program product of claim 7.

13. The computer system of claim 12, comprising at least a first processor in a first geographic location connected to a second processor in a second geographic location in a computer network, wherein at least some of the method steps are executed by the first processor and others of the method steps are executed by the second processor.

14. The computer system of claim 13, wherein the second processor is a computer server and the first processor is a client processor configured to request computing services from the second processor.

15. A computer program product comprising non-transitory instructions readable by a machine, the instructions configured to cause a computer to display and a printing system to print a digital artwork document, the instructions comprising instructions for generating, with the computer, a digital artwork document in accordance with a first set of computer-implemented instructions generated by a computerized expert system and a second set of computer-implemented instructions created as an exception to the first set of computer-implemented instructions, the first set of instructions including one or more portions of the digital artwork document modified to enhance or avoid a physically printed result relating to one or more features of the one or more portions, including a first set of digital objects generated in accordance with the first set of computer-implemented instructions to align to the one or more features of the one or more portions, the second set of computer-implemented instructions comprising one or more annotated instructions for modifying one or more selected portions of the one or more portions including a second set of digital objects, different from the first set, generated in accordance with the second set of computer-implemented instructions to align to one or more features of the one or more selected portions, the digital artwork document including one or more associations including at least one association between each annotated instruction and each corresponding selected portion, wherein each of the first set of computer-implemented instructions and the second set of computer-implemented instructions includes one or more instructions relating to at least one of: trapping of objects, reverse trapping of objects, pullback of objects, providing a rich black feature, providing a white underprint feature, or providing a spot varnish feature; and the computerized expert system is configured to analyze geometry and colors of the digital artwork, identify edges, identify a subset of edges that need to be trapped, and for each edge in the identified subset of edges, determine a trapping direction, create a trap object, and add the trap object to the digital artwork document.

16. The computer program product of claim 15, wherein at least some of the first set of computer-implemented instructions and the second set of computer-implemented instructions are hierarchically ordered, such that a hierarchically lower set of instructions overrules a hierarchically higher set of instructions.

17. A computer system configured to execute one or more steps in a printing workflow, the computer system comprising one or more machines programmed with the computer program product of claim 15.

18. The computer system of claim 17, comprising at least a first processor in a first geographic location connected to a second processor in a second geographic location in a computer network, wherein at least some of the method steps are executed by the first processor and others of the method steps are executed by the second processor.

19. The computer system of claim 18, wherein the second processor is a computer server and the first processor is a client processor configured to request computing services from the second processor.

* * * * *